United States Patent
Barnes et al.

(10) Patent No.: US 6,697,479 B1
(45) Date of Patent: Feb. 24, 2004

(54) SELECTIVE FILTERING OF INCOMING TELEPHONE CALLS

(75) Inventors: Stacey Alan Barnes, Round Rock, TX (US); James C. Colson, Austin, TX (US); James Patrick Robbins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/415,718

(22) Filed: Oct. 12, 1999

(51) Int. Cl.[7] ............................................. H04M 3/42
(52) U.S. Cl. ........................ 379/215.01; 379/88.19; 379/142.08
(58) Field of Search ..................... 379/67.1, 88.19, 379/88.2, 88.21, 207.15, 211.01, 211.02, 212.01, 215.01, 350, 352, 142.01, 142.04, 142.06, 142.08, 210.02

(56) References Cited

U.S. PATENT DOCUMENTS

| | | | |
|---|---|---|---|
| 4,893,329 A | | 1/1990 | O'Brien .................. 379/88.23 |
| 5,228,080 A | | 7/1993 | Nutter et al. .......... 379/373.02 |
| 5,351,289 A | | 9/1994 | Logsdon et al. ....... 379/142.04 |
| 5,377,260 A | | 12/1994 | Long ........................ 379/93.02 |
| 5,388,150 A | | 2/1995 | Schneyer et al. ........ 379/88.19 |
| 5,553,125 A | | 9/1996 | Martensson ................. 379/199 |
| 5,636,269 A | * | 6/1997 | Eisdorfer ................ 379/215.01 |
| 5,737,400 A | | 4/1998 | Bagchi et al. ......... 375/142.01 |
| 5,784,448 A | * | 7/1998 | Yaker .................... 379/215.01 |
| 5,812,648 A | | 9/1998 | Wanner ................. 379/142.06 |
| 5,825,867 A | * | 10/1998 | Epler et al. ............ 379/215.01 |
| 5,836,009 A | | 11/1998 | Diamond et al. ........ 379/93.23 |
| 5,848,142 A | | 12/1998 | Yaker .................... 379/215.01 |
| 5,926,534 A | | 7/1999 | Correia, II .................. 379/199 |
| 5,999,613 A | * | 12/1999 | Nabkel et al. ......... 379/215.01 |
| 6,359,970 B1 | * | 3/2002 | Burgess .................... 379/88.19 |

OTHER PUBLICATIONS

"Communications Enhancements Made Possible by Caller–ID", IBM Technical Disclosure Bulletin, vol. 37, No. 10, Oct. 1994, p27–31.

"Filtering Phone Calls", IBM Technical Disclosure Bulletin, vol. 36, No. 06B, Jun. 1993, p. 31.

* cited by examiner

Primary Examiner—Fan Tsang
Assistant Examiner—Ovidio Escalante
(74) Attorney, Agent, or Firm—Leslie A. Van Leeuwen; Bracewell & Patterson, L.L.P.

(57) ABSTRACT

Selective filtering of an incoming telephone call is provided wherein a caller ID information of a third party wishing to converse with a first party already engaged in conversation with a second party is retrieved. The priority level associated with the third party is then determined and compared to a priority level associated with the second party. In the event that the third party has a higher priority level than the second party, the first party is alerted to the occurrence of the incoming call. Alternatively, if the third party has a lower priority level than the second party, the incoming call to an alternate destination.

20 Claims, 2 Drawing Sheets

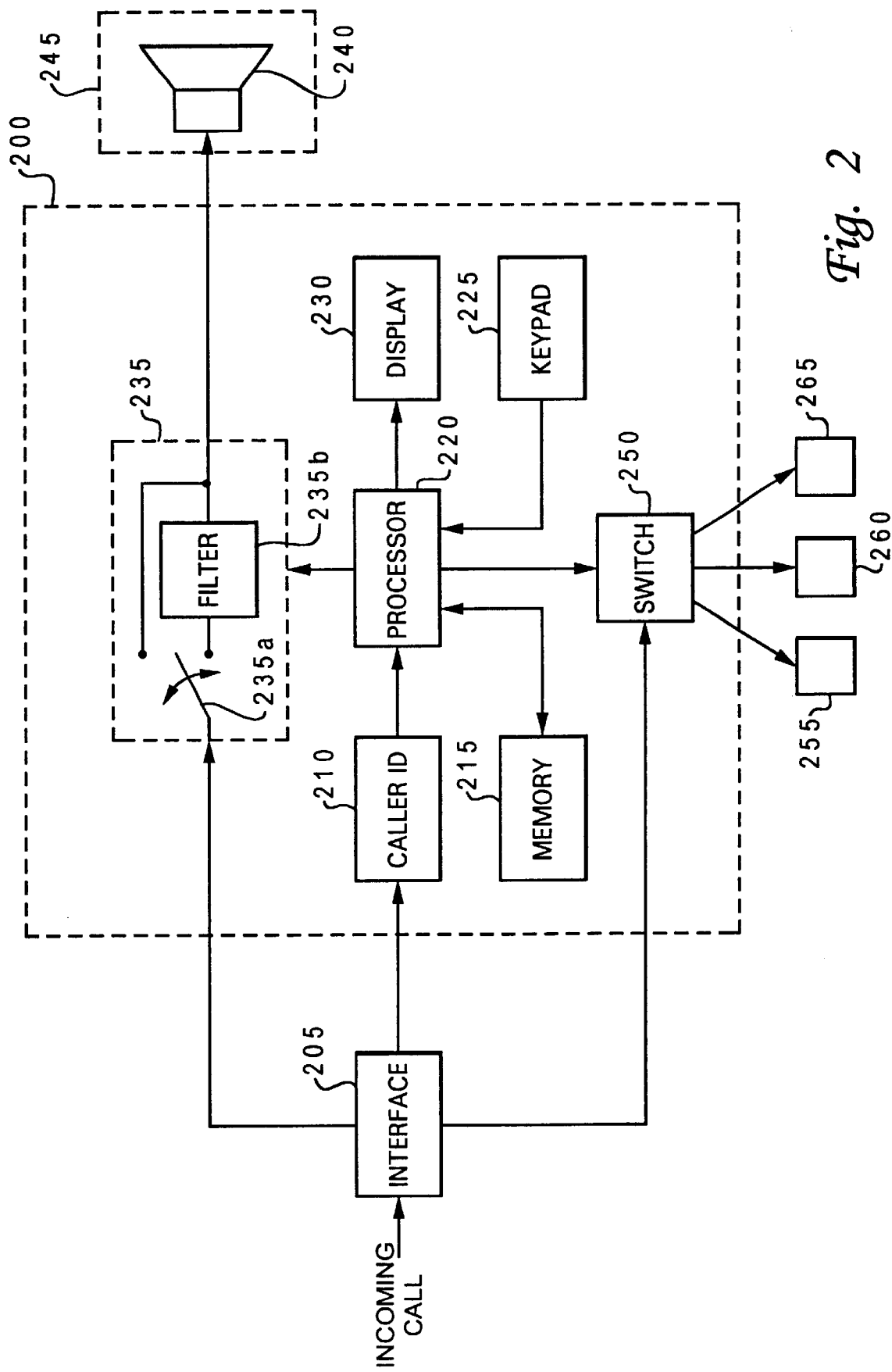

SELECTIVE FILTERING OF INCOMING TELEPHONE CALLS

BACKGROUND OF THE INVENTION

1. Technical Field of the Invention

The present invention relates generally to telecommunications and in particular to telephony services. Still more particularly, the present invention relates to a method, telephone apparatus and computer program product for selective filtering of an incoming phone call.

2. Description of the Related Art

A widely subscribed to telephony service offered by telephone companies is caller information of an incoming phone call, also known as caller ID. With the caller ID service, the telephone company transmits encoded information to the customer's telephone when a second party is calling the customer. The encoded information (caller ID information) typically includes the name and phone number of the calling party. The customer may purchase or lease equipment that decodes and displays the encoded information before the customer picks up the phone. The caller ID processing device is typically connected in parallel with the handset of the customer's telephone and displays the telephone number and possibly the name of the calling party, if available, without the customer's telephone switching from a "on-hook" state to an "off-hook" state. The caller ID information is generally sent to the customer from the telephone company's switching units as a frequency shift keyed (FSK) encoded binary signal that occurs between the first and second ringing cycle of the customer's telephone. The caller ID processing device demodulates the received FSK signal to provide a binary signal that is, in turn, decoded and supplied to a display device. This allows the customer to make a more informed decision as to whether or not to answer the phone. If the customer does not answer the phone, an off-hook signal is never received by the telephone company switching units. Consequently, the ringing continues until the calling party hangs up or the call is redirected to an alternate destination, e.g. the customer's voicemail or answering machine.

Call-waiting is another well known telephony feature that is provided as a service by the telephone companies. In conventional call-waiting, when a customer who subscribes to the call-waiting service is engaged in a telephone conversation with another party and a third party calls that customer, the customer receives an alerting signal, such as a subscriber access signal tone, while the third party continues to receive audible ringing. If the call-waiting customer chooses to receive the call from the third party, a switch-hook flash or pressing a selected button on the telephone set holds the second party while the customer's connection is switched to the third party. On the other hand, if the customer decides to ignore the subscriber access signal tone, a second subscriber access signal tone is generated after a few seconds. If the second subscriber access signal tone is also ignored by the customer, the third party is consequently given a busy signal. Alternatively, the third party may continue to receive the ringing tone and the customer also continues to receive the subscriber access signal tone, until the customer accepts the call from the third party or the third party hangs up.

Incoming telephone calls are frequently received during times when people would rather not be disturbed. For a consumer, this may include times when the subscriber is watching a rental movie, taking a nap, playing a game with the family, etc. In the case of a business person, these times may include receiving a call during a meeting, or while trying to work on a report with a short deadline. One approach to solve this problem, in the case of a consumer, is to simply take the. telephone off-hook. In the case of a business person, an advanced telephone system might include a "Do Not Disturb" feature that directs the incoming call immediately to an alternate destination, e.g., a voice mail system.

In the situation where an individual is already engaged in a telephone conversation with another person and a third party is attempting to contact the individual, a call-waiting alerting signal is utilized to alert the individual of the incoming call. Interruptions from incoming calls, however, may be undesired when the individual is currently engaged in a telephone conversation, e.g., a long distance call or a conference call. The presence of the alerting signals may become more than an annoyance and a distraction, ultimately disrupting the telephone conversation of the individual. An obvious solution is to disable the call-waiting feature. There are situations, however, when the individual may want to be notified of the incoming call. For example, the individual may be engaged in a telephone conversation with his immediate manager and does want to be disturbed by anybody but his immediate manager's superior, e.g., president of the company.

Accordingly, what is needed in the art is an improved method of utilizing the caller ID and call-waiting services provided by the telephone company that mitigates the above-mentioned limitations. In particular, there is a need in the art for a method that selectively filters incoming telephone calls to a first party who is already engaged in a telephone conversation with a second party.

SUMMARY OF THE INVENTION

It is therefore an object of the present invention to provide a system, method and computer program product for providing to a first party engaged in a telephonic conversation with a second party, selective filtering of an incoming telephone call from a third party.

To achieve the foregoing object, and in accordance with the invention as embodied and broadly described herein, a method, telephone apparatus and computer program product for providing to a first party engaged in a telephonic conversation with a second party, selective filtering of an incoming telephone call from a third party are disclosed. The method includes: (1) retrieving a caller ID information of the third party, (2) determining a priority level associated with the third party, (3) comparing a priority level associated with the second party to the priority level of the third party and (4) alerting, in response to the third party having a higher priority level than the second party, the first party to an occurrence of the incoming call. The method further includes redirecting, in response to the third party having a lower priority level than the second party, the incoming call to an alternate destination.

The telephone apparatus includes: (1) an incoming call detection circuit coupled to a telecommunication network for detecting and retrieving a caller ID information of the third party, (2) a memory device for storing data relating to assigned priority levels associated with a plurality of caller ID information corresponding to a plurality of calling parties, (3) a processor coupled to the incoming call detection circuit and the memory device for determining and comparing priority levels associated with the second and third parties and (4) means for alerting, responsive to the third party having a higher priority level than the second party, the first party to an occurrence of said incoming call. The telephone apparatus further includes switching means for redirecting, in response to the third party having a lower priority level than the second party, the incoming call to an alternate destination.

The present invention utilizes the subscriber services of caller ID and call waiting to provide to a user a novel method to selectively filter any incoming calls from a third party to the user while the user is already engaged in a telephonic conversation with another party. The method utilizes caller ID to identify the third party and, in one embodiment, employs an audible signal from the call waiting service to inform the user of a higher priority incoming call.

In one embodiment of the present invention, the alternate destination is a voicemail of the first party. Alternatively, the alternate destination may be the first party's answering machine or secretary. In a related embodiment, the first, second and third parties are coupled to a telecommunication network such as a public switched telephone network (PSTN). Alternatively, in another advantageous embodiment, the telecommunication network is a packet network, e.g., the Internet.

In another embodiment of the present invention, alerting the first party to the incoming call includes enabling a call-waiting function. In the event that the first party does not subscribe to a call-waiting service, an audible tone generator may be employed to provide an audible signal to inform the first party to the presence of an incoming call.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2 illustrates an embodiment of a telephone apparatus constructed utilizing the principles disclosed by the present invention.

DETAILED DESCRIPTION

Figure 1:
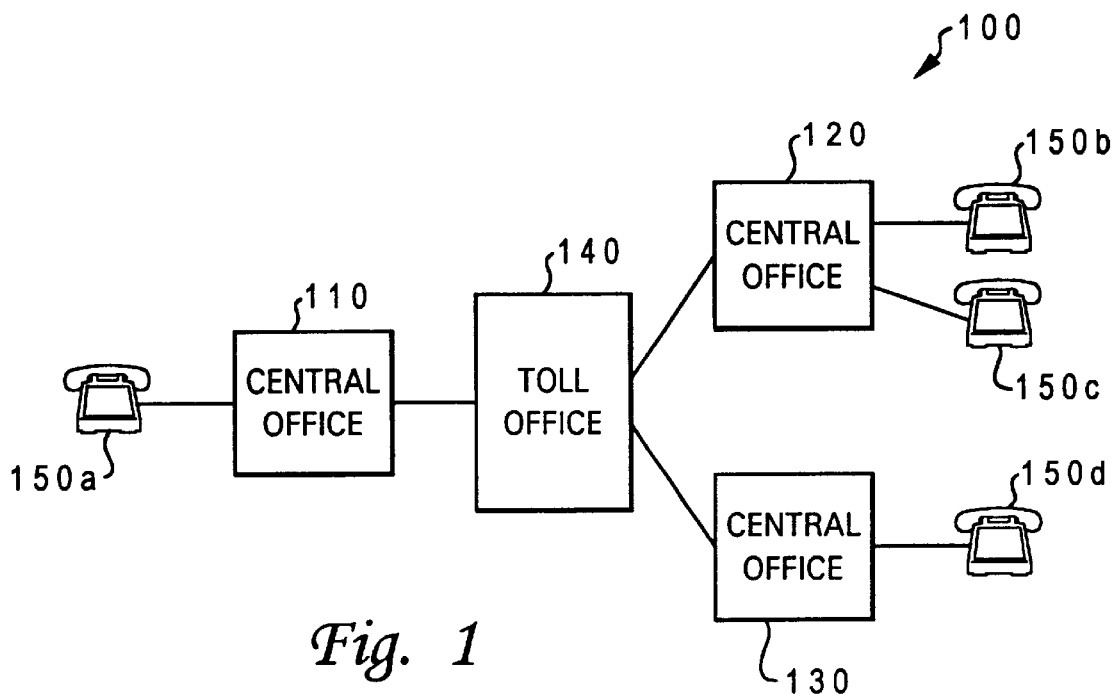
FIG. 1 illustrates an exemplary telecommunication network that provides a suitable environment for the practice of the present invention.

With reference now to the figures, and in particular, with reference to FIG. 1, there is depicted an exemplary telecommunication network, generally designated at reference numeral 100, that provides a suitable environment for the practice of the present invention. Network 100, as illustrated in FIG. 1, is a public switched telephone network (PSTN) that includes first, second and third central offices 110, 120, 130, respectively, coupled to a first, second, third and fourth stations 150a–150d, respectively.

A central office, or local exchange, e.g., second central office 120, exists to accomplish switching between second and third stations 150b, 150c and to provide communication paths between second and third stations 150b, 150c and first and fourth stations 150a, 150d attached to first and third central offices 110, 130, respectively. Long-distance calls are typically routed from a subscriber's station through the local central office to a toll office 140 and on toward a distant central office for connection to one of its local stations.

Toll office 140 is generally a switching system that switches calls among other switching offices. A call that is switched through a toll office is referred to as a toll call and is differentiated from a local call between stations attached to the same local central office. It should be readily apparent to those skilled in the art that although the illustrative embodiment of the present invention will be discussed in the context of a public switched network, the principles disclosed by the present invention may also be advantageously practiced in conjunction with different types of telecommunication networks, e.g., a private telecommunication network or a packet network such as the Internet. An example of a telecommunication network that provides both circuit-switching and packet-switching is disclosed in U.S. Pat. No. 5,848,142, issued to Rhoda Yaker, which is herein incorporated by reference.

Referring now to FIG. 2, there is illustrated an embodiment of a telephone apparatus 200 constructed utilizing the principles disclosed by the present invention. Telephone apparatus 200 includes a processor 220 that is coupled to a caller ID identification circuit 210, a memory device 215, an alphanumeric keypad 225, a display 230, a suppression circuit 235 and a switching device 250. Also shown coupled to telephone apparatus 200 is an interface 205 and a conventional telephone handset 245 that includes an earpiece 240.

Interface 205, in the illustrated embodiment, is a conventional telephone wall jack that provides an interface for an incoming and/or outgoing telephone call from a customer telephone to a local central office (analogous to the local central offices illustrated in FIG. 1). For the purposes of describing the present invention, it is assumed that the customer subscribes to caller ID and call-waiting services provided by the local telephone company. Interface 205 couples the incoming telephone signal to identification circuit 210 that, in an advantageous embodiment, is a FSK demodulator circuit, such as model XR2211 manufactured by Exar Corporation. In the case of caller ID information, FSK data, which may correspond to a calling party's telephone number, name, date, time stamp, etc., is received by identification circuit 210 that, in turn, translates the FSK data into a digital bit stream that is fed to processor 220 that translates the data into information displayed on display 230, e.g., a conventional monitor or a liquid crystal display (LCD).

Memory 215, e.g., a hard disk drive, is also shown coupled to processor 220 and is typically the repository of information corresponding to the customer's "address book." Alternatively, in another embodiment wherein processor 220 is connected to a network (not shown), the information, i.e., customer address book, may be centrally stored within the network, e.g., at the network server, and available to a plurality of devices that are connectable to the network. A user may retrieve the information from the network by using a varierty of means, such as user ID and password or a smartcard. In an advantageous embodiment, within the customer address book, each telephone number corresponding to an unique location, i.e., phone number, is assigned a priority number or level. Alternatively, in other advantageous embodiments, the priority level is assigned based on the identity of the individual associated with the telephone number. This database or registry of identified telephone numbers and their associated priority level is created and may be updated by the customer using keypad 225, e.g., a conventional keyboard, coupled to processor 220 that, in an advantageous embodiment, is a conventional microprocessor of the type Signetics PCD-3348, Intel 8051 or Fujitsu 8854. It should be noted that, in another advantageous embodiment, processor 220, memory 215, keypad 225 and display 230 may be also embodied in an IBM PC computer manufactured by IBM Corporation of Armonk, N.Y. It should also be readily apparent to those skilled in the art, however, that alternative computer system architectures may be employed.

Suppression circuit 235 is interposed between interface 205 and telephone handset 245 and coupled to processor 220 to provide a means to selectively suppress the call-waiting signal, i.e., audible tone. Suppression circuit 235 includes a switch 235a that, in one mode, places a filter 235b in-line between interface 205 and earpiece 240. Filter 235b, such as a notch filter (whose construction is well known in the art), is selectively tuned to attenuate or substantially eliminate the call waiting signal. In another mode of operation, switch 235a provides a path for the call-waiting signal to bypass filter 235b, thus allowing the call-waiting signal through to earpiece 240. Also shown coupled to interface 205 is switching device 250 that is typically a conventional switching mechanism controlled by processor 220 that provides alternate destinations, such as voicemail or answering machine, for an incoming telephone call.

A novel method for selective filtering of an incoming phone call from a third party while a first party is already engaged in a telephone conversation with a second party will hereinafter be described in greater detail with respect to FIG. 3, with continuing reference to FIGS. 1 and 2.

Figure 3:
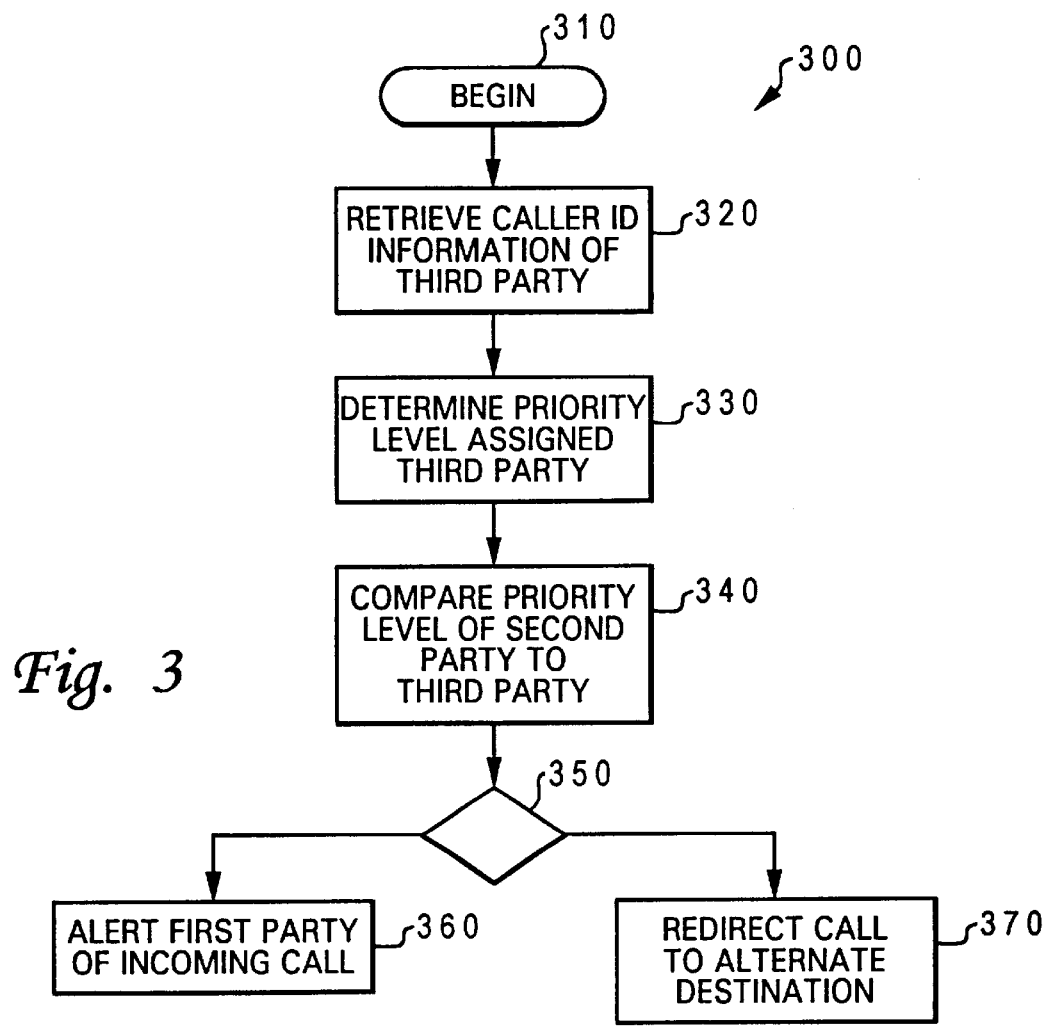
FIG. 3 illustrates a high-level logic flow chart of an embodiment of a selective filtering process of an incoming phone call.

Referring now to FIG. 3, there is depicted a high-level logic flow chart of an embodiment of a selective filtering process 300 of an incoming phone call. For the purposes of describing the present invention, the following initial conditions are assumed: (1) the customer or first party, e.g., second station 150b, subscribes to call-waiting and caller ID services and (2) the first party is already engaged in a telephone conversation with a second party, e.g., third station 150c. Process 300 is queued for execution, as illustrated in step 310, when an incoming phone call from a third party, e.g., fourth station 150d, to the first party is initiated. At second central office 120, the call is received and the subscriber's, i.e., first party, services profile, generally resident in a customer services database at the central office, is retrieved. After noting that the first party subscribes to call-waiting and caller ID, second central office 120 proceeds to sent a call-waiting signal, e.g., a 440 Hz. tone for about 300 milliseconds, and a FSK encoded signal containing the third party's information, such as telephone number and name, to the first party.

Following the detection of the incoming call, the caller ID information of the third party is retrieved and decoded by identification circuit 210, as depicted in step 320. The decoded signal containing the identification of the third party, is then provided to processor 220 that, in turn, determines the priority level, if any, that has been assigned to the third party. Processor 220 accomplishes this task by comparing an identifier associated with the third party, e.g., name or telephone number, as illustrated in step 330, with a database of identifiers and their assigned priority level that is resident in memory 215. In the event that the third party's identifier is not listed in the database or a priority level has not been pre-established, in an advantageous embodiment, a default priority level is assigned. Furthermore, in another embodiment, the default priority level is also a function of whether the incoming call is a local or toll, i.e., long-distance, call. Thus, a local call may be assigned a lower priority level than a toll call. It should be readily apparent to those skilled in the art that the number of priority levels and the criteria employed to assigned priority levels to incoming calls are dependent on the particular individual's profile.

After determining the priority level of the third party, process 300 then proceeds to compare the priority level of the third party to the priority level of the second party, as illustrated in step 340. The determination of the priority level of the second party is analogous to the method used to obtain the priority level of the third party, as described above. Alternatively, in an advantageous embodiment, the priority level of the second party can be adjusted "on the fly" (higher or lower) by the first party by reassigning a new priority level, e.g., at the initiation of the call between the first and second parties. It should be noted that second party's priority level may be initiated or changed, higher or lower, at any time during the telephonic conversation between the first and second parties. Thus, e.g., if the first party is engaged in a telephone conversation with a second party, e.g., a family member, that has been assigned a lower priority level, the first party may change (increase) the priority level recorded in memory 215 using keypad 225 to ensure that the telephone conversation will not be interrupted with a call-waiting signal. Next, as illustrated in a decisional step 350, if the priority level of the third party is determined to be greater than that of the second party, the first party is alerted to the incoming call. This is accomplished by switching switch 235a to remove filter 235b from the telephone line connection between interface 205 and handset 245. Removing filter 235b from the line connection allows the call-waiting signal, i.e., audible tone, to proceed to earpiece 240 of handset 245, alerting the first party of the incoming call.

In the event that the process illustrated at decisional step 350 concludes that the priority level of the third party is equal to or lower than the priority level of the second party, filter 235b is kept in place, i.e., in-line, thus blocking the call-waiting signal. The incoming call is then, as depicted in step 370, redirected via switch 250 to an alternate destination that may include the first party's voicemail, answering machine and secretary.

In the event that the first party does not subscribe to call-waiting, a conventional tone generator may be substituted in place of suppression circuit 235 to simulate the call-waiting signal. In this embodiment, the tone generator is controlled by processor 220 to inject a simulated call-waiting signal into earpiece 240 if the third party has a higher priority level than the second party, alerting the first party to the incoming telephone call.

It should be noted that although the above selective filtering process 300 has been described in the context of using telephone apparatus 200 at the first party's, or customer's, location, the selective filtering process may, in another embodiment, be accomplished at the central offices. For example, when the incoming call from the third party is routed through second central office 120, a customer services registry (not shown) at the central office, typically a database resident in a memory device, may be established to contain the priority level profiles selected by the first party is accessed to retrieve the priority level associated with the incoming call. The priority levels of the second and third parties are then compared and if the second party has a lower priority level, the call-waiting function is enabled at second central office 120 prior to connecting the call to interface 205. On the other hand, if the second party has a higher priority, the call-waiting function is not enabled. It should be readily apparent that the telephone apparatus 200 described in FIG. 2 will not be required if the selective filtering process is accomplished at the central offices. It should also be noted that the principles disclosed by the present invention may also be advantageously employed with Internet telephony applications.

It should be noted that although the present invention has been described, in one embodiment, in the context of a computer system, those skilled in the art will readily appreciate that the present invention is also capable of being distributed as a computer program product in a variety of forms; the present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links.

In an advantageous embodiment, the present invention is implemented in a computer system programmed to execute the method described herein. Accordingly, in an advantageous embodiment, sets of instructions for executing the method disclosed herein are resident in RAM of one or more of computer systems configured generally as described hereinabove. Until required by the computer system, the set of instructions may be stored as computer program product in another computer memory, e.g., a disk drive. In another advantageous embodiment, the computer program product may also be stored at another computer and transmitted to a user's computer system by an internal or external communication network, e.g., LAN or WAN, respectively.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing to a first party engaged in a telephonic conversation with a second party and having a call-waiting function activated, selective filtering of an incoming telephone call from a third party which includes an associated call waiting signal, comprising the steps of:

retrieving a caller ID information of said third party;

determining a priority level associated with said third party;

comparing a priority level associated with said second party to said priority level of said third party, and responsive to said third party having a lower priority level than said second party, suppressing said associated call waiting signal utilizing a suppression circuit at said first party's location, otherwise alerting said first party to an occurrence of said incoming call.

2. The method as recited in claim 1 further comprising the step of redirecting, in response to said third party having a lower priority level than said second party, said incoming call to an alternate destination.

3. The method as recited in claim 2 wherein said alternate destination is a voicemail of said first party.

4. The method as recited in claim 1 wherein said step of alerting said first party to said incoming call includes enabling a call waiting function.

5. The method as recited in claim 1 wherein said priority level of said second party is defined by said first party during said telephonic conversation.

6. The method as recited in claim 1 wherein said first, second and third parties are coupled to a telecommunication network that is selected from the group consisting of a public switched telephone network (PSTN) and a packet network.

7. The method as recited in claim 6 wherein said step of alerting first party to said incoming call includes generating an audible tone.

8. A telephone apparatus for allowing a first party engaged in a telephonic conversation with a second party and having a call waiting function activated to selectively filter an incoming telephone call from a third party which includes an associated call waiting signal, said telephone apparatus comprising:

an incoming call detection circuit coupled to a telecommunication network for detecting and retrieving a caller ED information of said third party;

a memory device for storing data relating to assigned priority levels associated with a plurality of caller ID information corresponding to a plurality of calling parties;

a processor coupled to said incoming call detection circuit and said memory device for determining and comparing priority levels associated with said second and said third parties; and a suppression circuit coupled to said processor, that suppresses said associated call waiting signal at said first party's location in response to said third party having a lower priority than said second party.

9. The telephone apparatus as recited in claim 8 further comprising switching means for redirecting, in response to said third party having a lower priority level than said second party, said incoming call to an alternate destination.

10. The telephone apparatus as recited in claim 9 wherein said alternate destination is a voicemail of said first party.

11. The telephone apparatus as recited in claim 8 wherein said suppression circuit includes a switch and a filter.

12. The telephone apparatus as recited in claim 8 wherein said priority level of said second party is defined by said first party during said telephonic conversation.

13. The telephone apparatus as recited in claim 8 wherein said telecommunication network is selected from the group consisting of a public switched telephone network (PSTN) and a packet network.

14. The telephone apparatus as recited in claim 8 wherein said suppression circuit includes an audible tone generator.

15. A computer program product comprising:

a computer-readable medium having stored thereon computer executable instructions for implementing a method for providing to a first party engaged in a telephonic convention with a second party and having a call waiting function activated, selective filtering of an incoming telephone call from a third party which includes an associated call waiting signal, said computer executable instructions when executed, perform the steps of:

retrieving a caller ID information of said third party;

determining a priority level associated with said third party;

comparing a priority level associated with said second party to said priority level of said third party, and responsive to said third party having a lower priority level than said second party, suppressing said associated call waiting signal utilizing a suppression circuit at said first party's location, otherwise alerting said first party to an occurrence of said incoming call.

16. The computer executable instructions as recited in claim 15 further comprising the step of redirecting, in response to said third party having a lower priority level than said second party, said incoming call to an alternate destination.

17. The computer executable instructions as recited in claim 16 wherein said alternate destination is a voicemail of said first party.

18. The computer executable instructions as recited in claim 15 wherein said step of alerting said first party to said incoming call includes enabling a call waiting function.

19. The computer executable instructions as recited in claim 15 wherein said priority level of said second party is defined by said first party during said telephonic conversation.

20. The computer executable instructions as recited in claim 15 wherein said step of alerting said first party to said incoming call includes generating an audible tone.

* * * * *

UNITED STATES PATENT AND TRADEMARK OFFICE
CERTIFICATE OF CORRECTION

PATENT NO.   : 6,697,479 B1
DATED        : February 24, 2004
INVENTOR(S)  : Barnes et al.

It is certified that error appears in the above-identified patent and that said Letters Patent is hereby corrected as shown below:

Column 7,
Line 61, please delete "ED" and replace it with -- ID --.

Signed and Sealed this

Third Day of May, 2005

JON W. DUDAS
*Director of the United States Patent and Trademark Office*